US006725533B1

(12) United States Patent

Losinger

(10) Patent No.: US 6,725,533 B1
(45) Date of Patent: Apr. 27, 2004

(54) CABLE STRIPPING TOOL

(75) Inventor: Roger M. Losinger, Liberty, PA (US)

(73) Assignee: Lemco Tool Corporation, Logan Station, PA (US)

(*) Notice: Subject to any disclaimer, the term of this patent is extended or adjusted under 35 U.S.C. 154(b) by 0 days.

(21) Appl. No.: 09/528,865

(22) Filed: Mar. 20, 2000

(51) Int. Cl.[7] ........................ B23P 19/04; B21F 13/00

(52) U.S. Cl. ........................ 29/764; 29/270; 29/282; 29/758; 30/90.1

(58) Field of Search ........................ 29/564.8, 867, 29/828, 825, 270, 282, 745, 758, 762, 764; 81/9.41–9.43, 423; 30/90.1, 90.6, 91.1, 91.2

(56) References Cited

U.S. PATENT DOCUMENTS

| | | | | | |
|---|---|---|---|---|---|
| 4,932,091 | A | * | 6/1990 | Krzyzanski | 7/107 |
| 4,945,636 | A | * | 8/1990 | Takizawa | 30/91.2 |
| 4,958,433 | A | * | 9/1990 | Persson | 30/91.2 |
| 4,979,299 | A | * | 12/1990 | Bieganski | 30/90.1 |
| 5,036,734 | A | * | 8/1991 | Morrow | 81/9.44 |
| 5,050,302 | A | * | 9/1991 | Mills | 30/90.8 |
| 5,062,192 | A | * | 11/1991 | Sawyer et al. | 29/426.4 |
| 5,070,615 | A | * | 12/1991 | Michael, III | 30/90.8 |
| 5,150,522 | A | * | 9/1992 | Gwo-Jiang | 30/91.2 |
| 5,255,422 | A | * | 10/1993 | Russo et al. | 29/270 X |
| 5,265,339 | A | * | 11/1993 | Nilsson | 30/91.1 |
| 5,323,502 | A | * | 6/1994 | Miller | 7/107 |
| 6,128,976 | A | * | 10/2000 | Tarpill | 81/9.44 |

FOREIGN PATENT DOCUMENTS

| | | | | |
|---|---|---|---|---|
| JP | 4-87 | * | 1/1992 | 29/270 X |

* cited by examiner

*Primary Examiner*—A. Dexter Tugbang
(74) *Attorney, Agent, or Firm*—John J. Elnitski, Jr.

(57) ABSTRACT

A cable stripping tool for removing an outer protective jacket of a cable. The cable stripping tool is used to remove a pre-defined amount of the jacket in one rotation of the cable stripping tool. The cable stripping tool allows the rotation of the cable stripping tool by hand during jacket removal in tight areas, where other stripping tools are too difficult to use. The cable stripping tool includes a main body and a cutting blade. The main body includes a blade half and a clamping half. The main body is preferably made from a plastic material to lower production cost, but can be made from marry other types of materials. The blade half and clamping half are binged together by a hinge pin. An inside surface of each half together form a cable receiving area between each other to receive the cable, when the halves are mated and closed.

22 Claims, 7 Drawing Sheets

CABLE STRIPPING TOOL

BACKGROUND

There are occasions when a piece of a outer protective jacket of a conductive cable needs to be stripped just enough between the ends of the cable to allow attachment of an electrical connector. This requires the cable to be stripped of the piece of jacket in a certain area to receive the connector, while maintaining the jacket material on either side of the piece to be stripped in order to protect the cable. There are many devices known for stripping cable, from a knife to complicated cable stripping machines. The commonly used devices have a blade smaller than the piece of jacket to be removed and removes the jacket in a spiral fashion. This requires the user to determine the starting and stopping point for the blade. It also requires the user to make more than one rotation around the cable to remove the piece of jacket. These commonly used devices are especially difficult for workmen in the field to use on a cable already in use in an area where there is not much room to work due to other cables. What is needed is a cable stripping tool which is easy to attach to a cable and easy to use while stripping the cable.

It is an object of the present invention to provide a cable stripping tool which is relatively easy to apply to a cable in use, provides a predetermined way to remove just enough jacket in one rotation and improves the ability of a workman to strip a piece of jacket protecting the cable in a certain area in order to receive a connector.

It is an object of the present invention to provide a cable stripping tool which is relatively easy to use in areas where there is not much room to strip a cable.

SUMMARY OF THE INVENTION

The present invention is a cable stripping tool for removing an outer protective jacket of a cable. The cable stripping tool is used to remove a pre-defined amount of the jacket in one rotation of the cable stripping tool. The cable stripping tool allows the rotation of the cable stripping tool by hand during jacket removal in tight areas, where other stripping tools are too difficult to use. The cable stripping tool includes a main body and a cutting blade. The main body includes a blade half and a clamping half. The main body is preferably made from a plastic material to lower production cost, but can be made from many other types of materials. The blade half and clamping half are hinged together by a hinge pin. An inside surface of each half together form a cable receiving area between each other to receive the cable, when the halves are mated and closed.

DETAILED DESCRIPTION OF THE INVENTION

Figure 1:
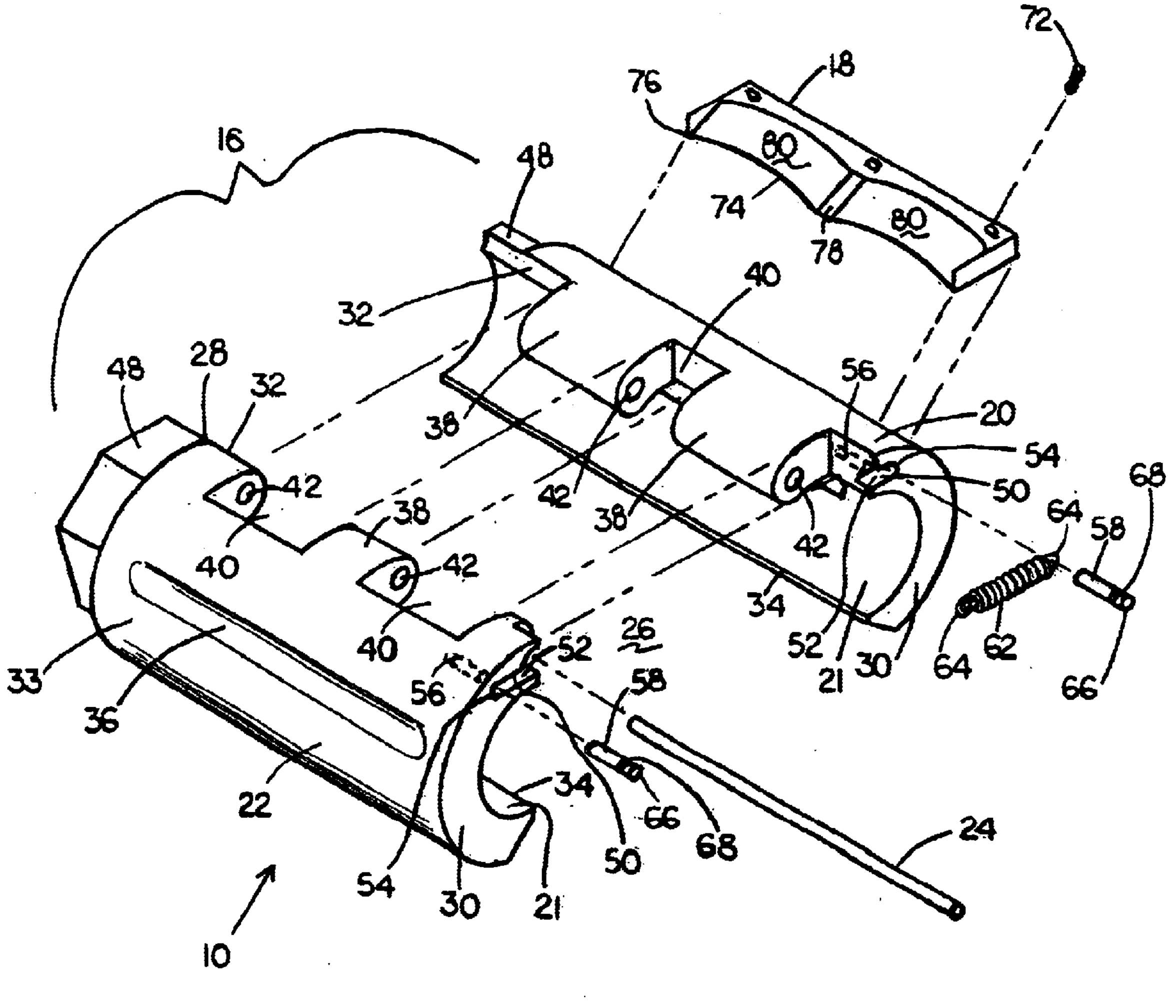
FIG. 1 is exploded view of a cable stripping tool according to the present invention.

The present invention is a cable stripping tool 10, as shown in FIGS. 1–9. The cable stripping tool 10 is for removing an outer protective jacket 12 of a cable 14. The cable stripping tool 10 is used to remove a pre-defined amount of the jacket 12 with one rotation of the cable stripping tool 14. Removing a pre-defined amount of the jacket 12 removes the possibility of the user removing too much jacket material. The cable stripping tool 10 allows the rotation of the cable stripping tool 10 by hand during jacket 12 removal in tight areas, where other stripping tools are too difficult to use. The cable stripping tool 10 includes a main body 16 and a cutting blade 18. The main body 16 includes a blade half 20 and a clamping half 22. The main body 16 is preferably made from a plastic material to lower production cost, but can be made from many other types of materials. The blade half 20 and clamping half 22 are hinged together by a hinge pin 24. An inside surface 21 of each half 20, 22 together form a cable receiving area 26 between each other to receive the cable 14, when the halves 20, 22 are mated and closed.

Figure 2:
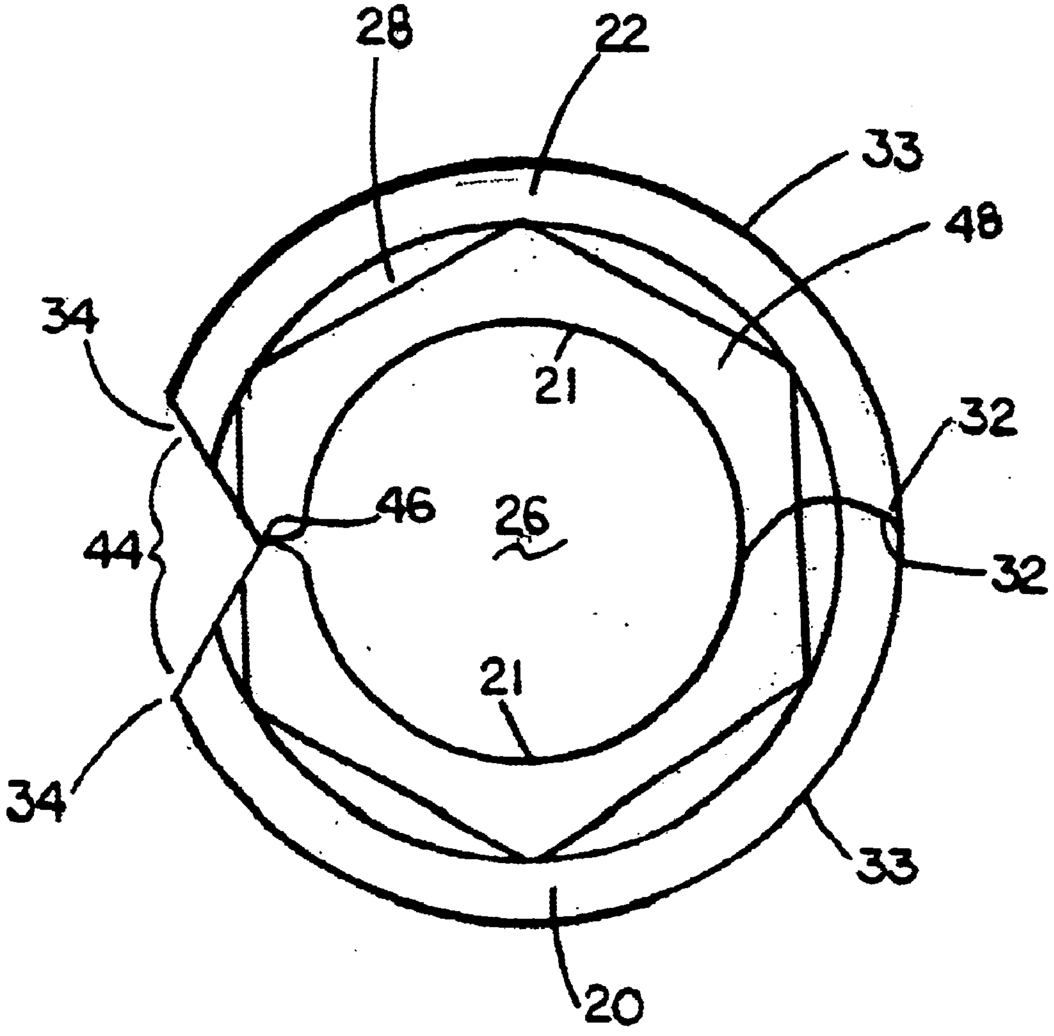
FIG. 2 is a first end view of a cable stripping tool according to the present invention.
Figure 3:
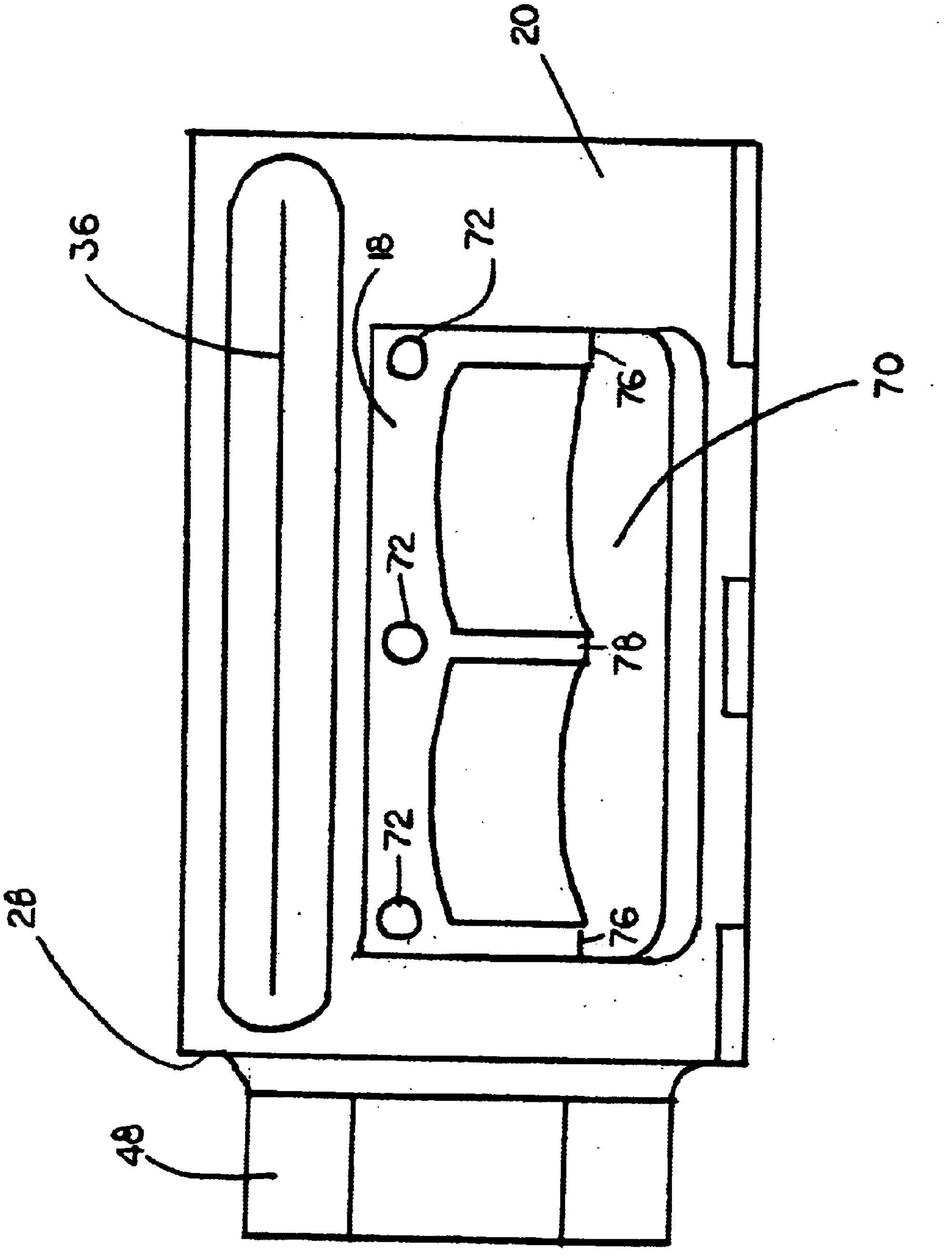
FIG. 3 is a top view of a blade half according to the present invention.

Each half 20, 22 includes a first end 28, a second end 30, a first side 32 and a second side 34. Each half 20, 22 also includes gripping depressions 36 on an outside surface 33 between the first and second sides 32, 34. The first side 32 of each half 20, 22 is formed having ears 38 and ear slots 40 similar to a door hinge. Whereby, the ears 38 of one half 20, 22 fit into the ear slots 40 of the other half 20, 22. The ears 38 include an ear hole 42 to receive the hinge pin 24, when all of the ears 38 for both halves 20, 22 are aligned. Also, the ears 38 are rounded so the halves 20, 22 do not interfere with each other during movement of the halves 20, 22. The second side 34 of the halves 20, 22 is of an angle, such that when hinged together, the halves 20, 22 form a V-shape 44 opposite the first sides 32. Whereby, a bottom 46 of the,V-shape 44 is closest to the cable receiving area 26, as shown in FIG. 2.

Figure 4:
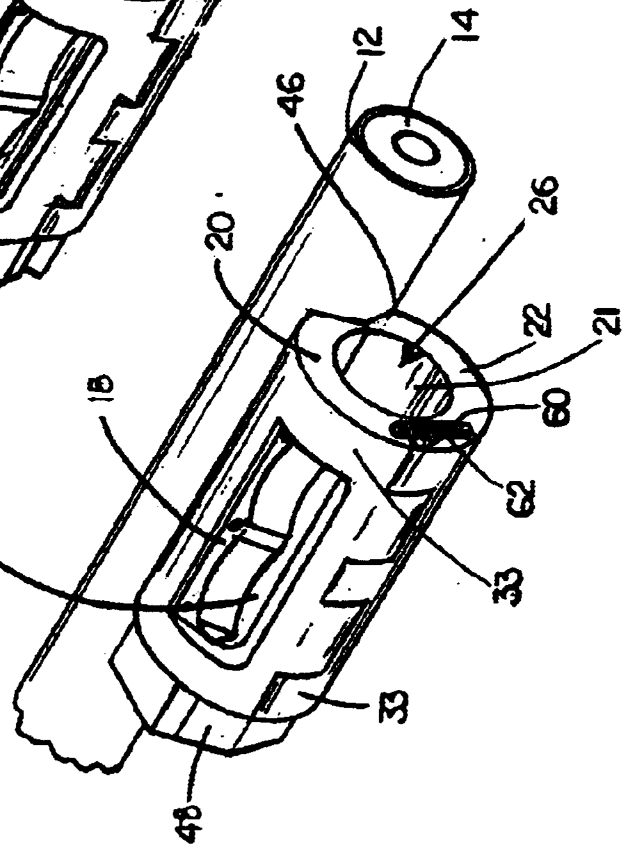
FIG. 4 is a perspective view of the cable stripping tool being installed on a jacketed cable according to the present invention.

The first end 28 of each half 20, 22 is formed such that when the halves 20, 22 are closed, the first ends 28 form a nut 48 to receive a wrench. The second end 30 of each half 20, 22 is formed with a partial slot 50 which begins at the first side 32 of the halves 20, 22. Each partial slot 50 includes a first end 52 and a second end 54. The first end 52 of the partial slot 50 is positioned near the first side 32, while the second end 54 is positioned away from the first side 32. The second end. 54 is closed and includes a slot hole 56 to receive a spring retaining pin 58, while the first end 52 is open ended. The two partial slots 50 form a continuous main slot 60 when the halves 20, 22 are assembled. The main slot 60 is for receiving a tension spring 62 having spring ends 64 hooked to each of the spring retaining pins 58. The spring retaining pins 58 are pressed into the slot holes 56, whereby a groove end 66 of the pins 58 extends outward from the slot hole 56 and into the partial slot 50. The groove ends 66 include a groove 68 to retain the spring ends 64. The tension spring 62 is used to retain the halves 20, 22 in a closed position as shown in FIG. 4.

The blade half 20 additionally includes an open blade area 70 to receive the blade 18, as shown in FIGS. 3–7. The open blade area 70 allows the blade 18 to be mounted to the blade half 20 with three screws 72. Whereby, the cutting edge 74 of the blade 18 extends into the cable receiving area 26. The open blade area 70 is large enough to allow the jacket 12 to move away from the blade 18 and hence, the cable stripping tool 10 during cutting of the jacket 12. The cutting edge 74 of the blade 18 has two ends 76 and a middle 78. Between each end 76 and the middle 78 is an individual cutting section 80 having a rounded shape. This is because the cutting edge 74 has a unique shape, where the ends 76 and the middle 78 of the cutting edge 74 extend outward a little further than the cutting sections 80. The cutting edge 74 shape allows the ends 76 and the middle 78 of the blade 18 to make an initial bite into the jacket 12, before the entire blade 18 cuts into the jacket 12. Not using the entire blade 18 to provide the initial bite into the jacket 12 allows less force to be applied during the initial rotation of the cable stripping tool 10. The length of the blade 18 is sized to remove enough of the jacket 12 of the cable 14 as necessary to fit the connector to be used on the cable 14.

Figure 6:
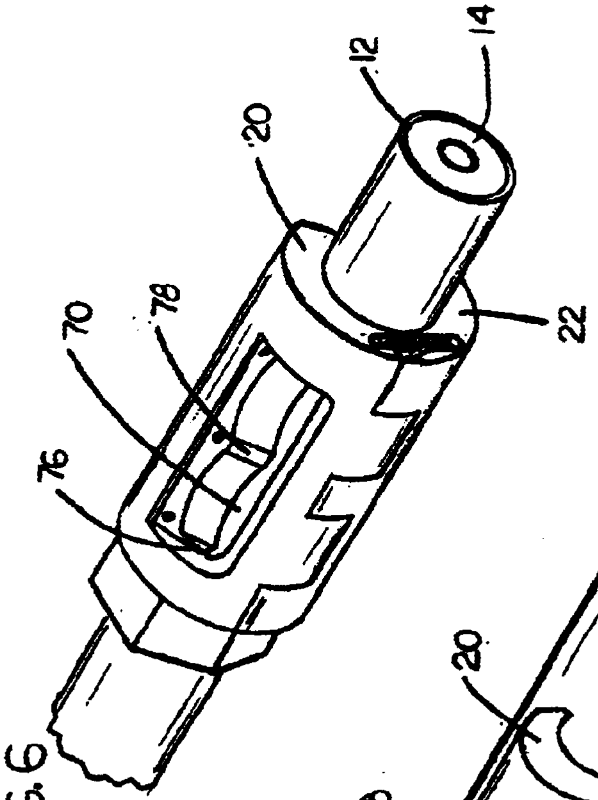
FIG. 6 is a perspective view of the cable stripping tool being installed on a jacketed cable according to the present invention.
Figure 5:
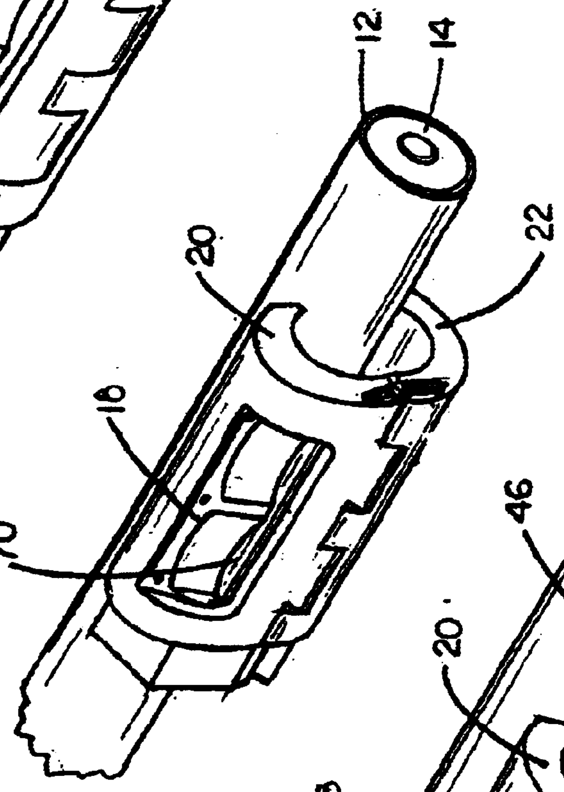
FIG. 5 is a perspective view of the cable stripping tool being installed on a jacketed cable according to the present invention.
Figure 7:
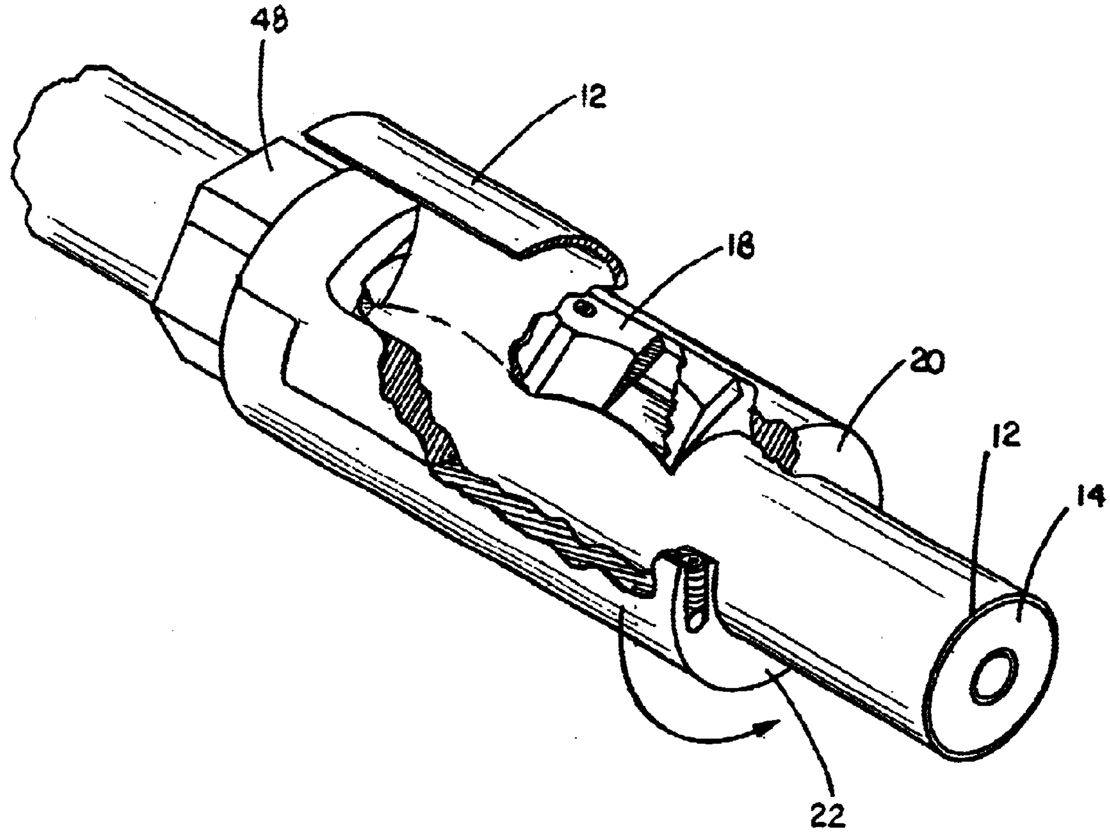
FIG. 7 is a perspective cut-a-way view of the cable stripping tool stripping a piece of jacket from a jacketed cable according to the present invention.
Figure 8:
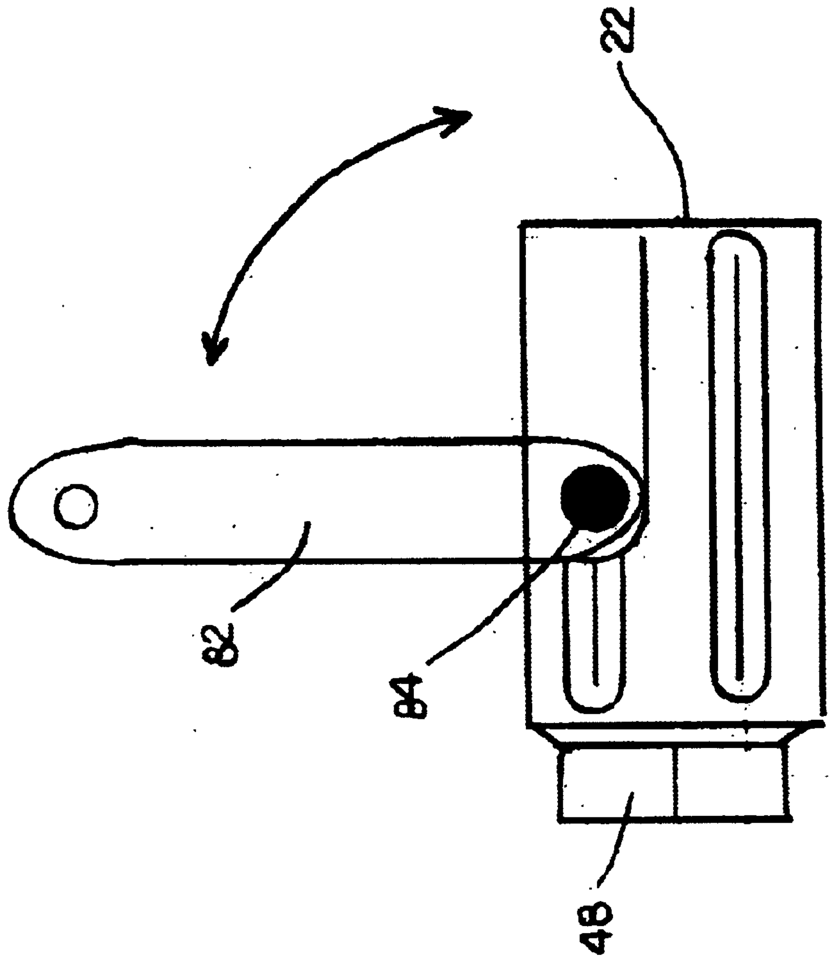
FIG. 8 is a perspective view of a handle on a cable stripping tool according to the present invention.
Figure 9:
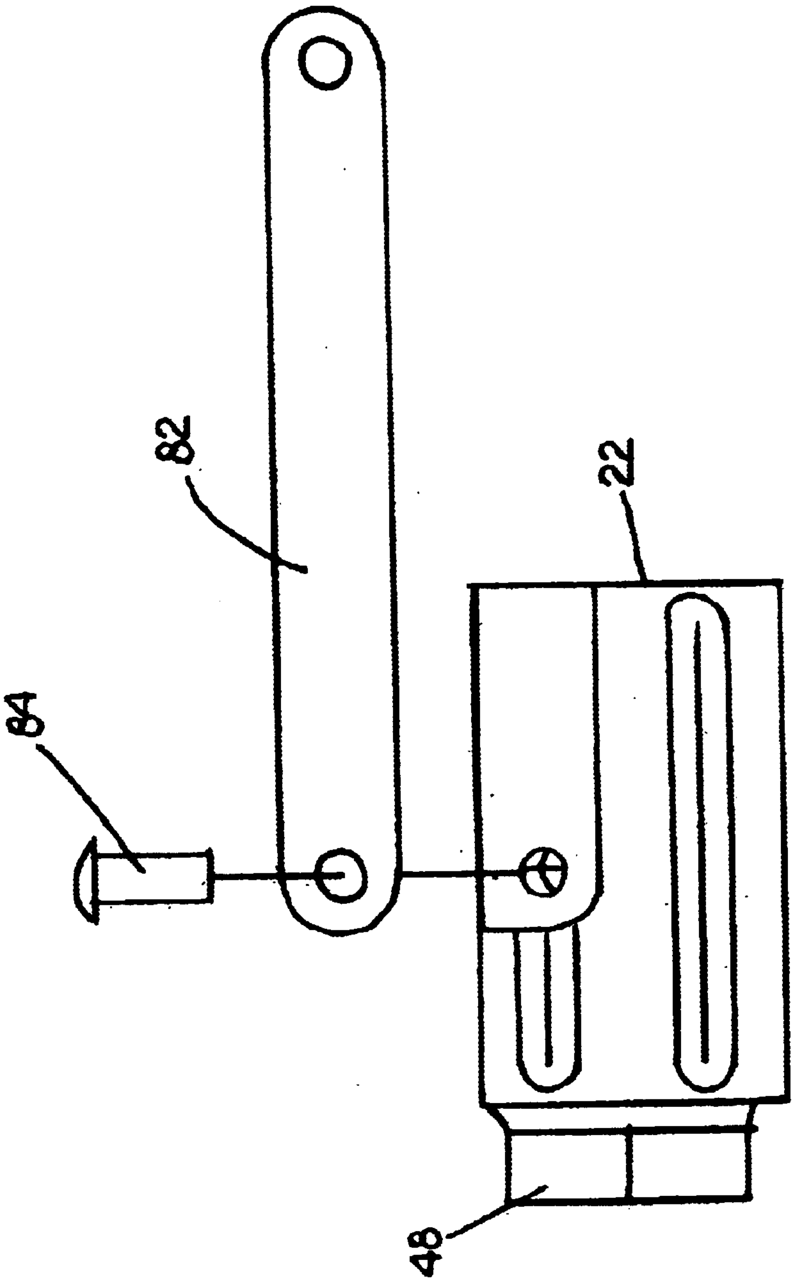
FIG. 9 is an exploded view of a handle on a cable stripping tool according to the present invention.

Operation of the cable stripping tool 10 is as follows. The cable stripping tool 10 is in a closed position and the second sides 34 of the halves 20, 22, which form the V-shape 44, are pushed against the cable 14 to be stripped, as shown in FIG. 4. The V-shape 44 naturally forces the halves 20, 22 to open as the cable stripping tool 10 is pushed against the cable 14. The V-shape 44 also deters the cable stripping tool 10 from slipping away from the cable 14 during initial installation of the cable stripping tool 10 onto the cable 14. The cable stripping tool 10 is then pushed onto the cable 14, until the cable 14 is in the cable receiving area 26 and the halves 20, 22 close around the cable 14, as shown in FIG. 5. The halves 20, 22 are then pressured against the jacket 12, such that the ends 76 and the middle 78 of the cutting edge 74 are pressed into the jacket 12 of the cable 14 in order to make the initial bite, as shown in FIG. 6. The cable stripping tool 10 is rotated around the cable 14 in the direction that the cutting edge 74 extends into open blade area 70 in order to cut a piece of the jacket 12 from the cable 14, as shown in FIG. 7. The cable stripping tool 10 can be rotated by hand or by using a wrench on the nut 48 formed by the first ends 28 of the halves 20, 22. When rotating the cable stripping tool 10 by hand, the gripping depressions 36 are used to ensure the users hand does not slip from the cable stripping tool 10. Also, as shown in FIG. 8, a handle 82 perpendicular to the length of the halves 20, 22 can be attached to the clamping half 22. The handle 82 is used to initiate the biting of the cutting edge 74 into the jacket 12. The handle 82 is shown in FIG. 9 rotatably attached to the clamping half 22 by a rivet 84. Rotatably attaching the handle 82 allows the handle 82 to be folded down parallel with the length of the halves 20, 22 after making the initial bite into the jacket 12, so as not to interfere with rotation of the cable stripping tool 10 in tight areas. The wrench on the nut 48 can also be used to make the initial bite into the jacket 12.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. A cable stripping tool, adapted to strip a pre-defined amount of cable jacket from a cable without removing remaining cable jacket on either side of the pre-defined amount of cable jacket, comprising:

a main body having a longitudinal axis, said main separated into a blade half and a clamping half;

said blade half having a first end, a second end, a first side, a second side, an inside surface and an outside surface;

said clamping half hinged to said blade half having a first end, a second end, a first side, a second side, an inside surface and an outside surface;

said first ends and second ends of said blade and clamping halves together forming ends of said main body along said longitudinal axis of said main body;

a cable receiving area formed by said ends of said main body and inside surfaces of said blade half and clamping half when said blade and clamping halves are in a closed position, said cable receiving area in the direction and extending along said longitudinal axis of said main body, said ends of said main body being open ended and adapted to allow passage of the cable and adapted to also allow positioning of said cable stripping tool along the cable;

said first side of said clamping half and said first side of said blade half being hinged together, said second side of said clamping half and said second side of said blade half forming an opening which is adapted to allow placement of said main body over a cable when said blade and clamping halves are in an open position; and a blade mounted to said main body in the direction of said longitudinal axis of said main body such that said blade accesses the cable receiving area and adapted to allow stripping of the jacket from the cable, said blade secured in said blade half, said blade including a cutting edge, said cutting edge positioned in said cable receiving area and adapted to remove the pre-defined amount of cable jacket during one rotation of said main body about the cable.

2. The cable stripping tool of claim 1, further including a hinge pin to hinge said blade and clamping halves together.

3. The cable stripping tool of claim 1, wherein said first side of each of said blade and clamping halves include ears and ear slots to form said hinge, wherein said ears of said blade half fit into said ear slots of said clamping half and wherein said ears of said clamping half fit into said ear slots of said blade half.

4. The cable stripping tool of claim 3, wherein said ears include a hole to receive a hinge pin.

5. The cable stripping tool of claim 1, further including gripping depressions on each of said outside surfaces of said blade and clamping halves, said gripping depressions adapted to allow rotation of said cable stripping tool about the cable.

6. The cable stripping tool of claim 1, wherein said second sides of each of said blade and clamping halves form a V shape when said blade and clamping halves are in a closed position and said second sides are therefore mated together.

7. The cable stripping tool of claim 1, wherein said first ends of each of said blade and clamping halves form a nut on one end of said cable stripping tool when said blade and clamping halves are in a closed position and said first ends are mated together, said nut adapted to receive a tool to rotate said cable stripping tool about the cable.

8. The cable stripping tool of claim 1, further including a spring to bias said blade and clamping halves in said closed position.

9. The cable stripping tool of claim 8, wherein said spring is connected to both said blade and clamping halves.

10. The cable stripping tool of claim 9, wherein said spring is connected to said second ends of said blade and clamping halves.

11. The cable stripping tool of claim 10, wherein said spring is contained in a slot formed by said second ends of said blade and clamping halves.

12. The cable stripping tool of claim 1, wherein said blade half includes an open blade area to receive and mount said blade; and wherein said open area is adapted to allow the section of jacket stripped from the cable to move away from said cable stripping tool during jacket removal.

13. The cable stripping tool of claim 1, wherein said blade includes a single length of cutting edge having two ends and a middle and a cutting section between each of said ends and said middle; and wherein said two ends and middle extend into said cable receiving area further than said cutting sections.

14. The cable stripping tool of claim 1, further including a handle on said clamping half to aid in rotation of said cable stripping tool.

15. The cable stripping tool of claim 14, wherein said handle is rotatably attached so that said handle can fold out of the way on said clamping half.

16. The cable stripping tool of claim 1, further including a handle on said blade half to aid in rotation of said cable stripping tool.

17. The cable stripping tool of claim 16, wherein said handle is rotatably attached so that it can fold out of the way on said blade half.

18. A cable stripping tool, adapted to strip a pre-defined amount of cable jacket from a cable without removing remaining cable jacket on either side of the pre-defined amount of cable jacket, comprising:

a main body having a longitudinal axis, said main separated into a blade half and a clamping half;

said blade half having a first end, a second end, a first side, a second side, an inside surface and an outside surface;

said clamping half hinged to said blade half having a first end, a second end, a first side, a second side, an inside surface and an outside surface;

said first ends and second ends of said blade and clamping halves together forming ends of said main body along said longitudinal axis of said main body;

gripping depressions on each of said outside surfaces of said blade and clamping halves, said pipping depressions adapted to allow rotation of said cable stripping tool about the cable;

a cable receiving area formed by said ends of said main body and inside surfaces of said blade half and clamping half when said blade and clamping halves are in a closed position, said cable receiving area in the direction and extending along said longitudinal axis of said main body, said ends of said main body being open ended and adapted to allow passage of the cable and of adapted to also allow positioning of said cable stripping tool along the cable; and a blade mounted to said main body in the direction of said longitudinal axis of said main body such that said blade accesses the cable receiving area to allow stripping of the jacket from the cable, said blade secured in said blade half, said blade including a cutting edge, said cutting edge positioned in said cable receiving area and adapted to remove the pre-defined amount of cable jacket during one rotation of said main body about the cable.

19. A cable stripping tool, adapted to strip a pre-defined amount of cable jacket from a cable without removing remaining cable jacket on either side of the pre-defined amount of cable jacket, comprising:

a main body having a longitudinal axis, said main separated into a blade half and a clamping half;

said blade half having a first end, a second end, a first side, a second side, an inside surface, and an outside surface;

said clamping half hinged to said blade half having a first end, a second end, a first side, a second side, an inside surface and an outside surface;

said first ends and second ends of said blade and clamping halves together forming ends of said main body along said longitudinal axis of said main body;

a cable receiving area formed by said ends of said main body and inside surfaces of said blade half and clamping half when said blade and clamping halves are in a closed position, said cable receiving area in the direction and extending along said longitudinal axis of said main body, said ends of said main body being open ended and adapted to allow passage of the cable and adapted to also allow positioning of said cable stripping tool along the cable;

said second sides of each of said blade and clamping halves forming a V-shape when said blade and clamping halves are in a closed position and said second sides are therefore mated together; and a blade mounted to said main body in the direction of said longitudinal axis of said main body such that said blade accesses the cable receiving area to allow stripping of the jacket from the cable, said blade secured in said blade half, said blade including a cutting edge, said cutting edge positioned in said cable receiving area and adapted to remove the pre-defined amount of cable jacket during one rotation of said main body about the cable.

20. A cable stripping tool, adapted to strip a pre-defined amount of cable jacket from a cable without removing remaining cable jacket on either side of the pre-defined amount of cable jacket, comprising:

a main body having a longitudinal axis, said main separated into a blade half and a clamping half;

said blade half having a first end, a second end, a first side, a second side, an inside surface and an outside surface;

said clamping half hinged to said blade half having a first end, a second end, a first side, a second side, an inside surface and an outside surface;

said first ends and second ends of said blade and clamping halves together forming ends of said main body along said longitudinal axis of said main body;

a cable receiving area formed by said ends of said main body and inside surfaces of said blade half and clamping half when said blade and clamping halves are in a closed position, said cable receiving area in the direction and extending along said longitudinal axis of said main body, said ends of said main body being open ended and adapted to allow passage of the cable and adapted to also allow positioning of said cable stripping tool along the cable;

said first ends of each of said blade and clamping halves forming a nut on one end of said cable stripping tool when said blade and clamping halves are in a closed position and said first ends are mated together, said nut adapted to receive a tool to rotate said cable stripping tool about the cable; and a blade mounted to said main body in the direction of said longitudinal axis of said main body such that said blade accesses the cable receiving area to allow stripping of the jacket from the cable, said blade secured in said blade half, said blade including a cutting edge, said cutting edge positioned in said cable receiving area and adapted to remove the pre-defined amount of cable jacket during one rotation of said main body about the cable.

21. A cable stripping tool, adapted to strip a pre-defined amount of cable jacket from a cable without removing remaining cable jacket on either side of the pre-defined amount of cable jacket, comprising:

a main body having a longitudinal axis, said main separated into a blade half and a clamping half;

said blade half having a first end, a second end, a first side, a second side, an inside surface and an outside surface;

said clamping half hinged to said blade half having a first and, a second end, a first side, a second side, an inside surface and an outside surface;

said first end; and second ends of said blade and clamping halves together forming ends of said main body along said longitudinal axis of said main body;

a cable receiving area formed by said ends of said main body and inside surfaces of said blade half and clamping half when said blade and clamping halves are in a closed position, said cable receiving area in the direction and extending along said longitudinal axis of said main body, said ends of said main body being open ended and adapted to allow passage of the cable and adapted to also allow positioning of said cable stripping tool along the cable;

a spring to bias said blade and clamping halves in said closed position, said spring is connected to both said blade and clamping halves, said spring is connected to said second ends of said blade and clamping halves, said spring is contained in a slot formed by said second ends of said blade and clamping halves; and a blade mounted to said main body in the direction of said longitudinal axis of said main body such that said blade accesses the cable receiving area to allow stripping of the jacket from the cables, said blade secured in said blade half, said blade including a cutting edge, said cutting edge positioned in said cable receiving area and adapted to remove the pre-defined amount of cable jacket during one rotation of said main body about the cable.

22. A cable stripping tool, adapted to strip a pre-defined amount of cable jacket from a cable without removing remaining cable jacket on either side of the pre-defined amount of cable jacket, comprising:

a main body having a longitudinal axis, said main separated into a blade half and a clamping half;

said blade half having a first end, a second end, a first side, a second side, an inside surface and an outside surface;

said clamping half hinged to said blade half having a first end, a second end, a first side, a second side, an inside surface and an outside surface;

said first ends and second ends of said blade and clamping halves together forming ends of said main body along said longitudinal axis of said main body;

a cable receiving area formed by said ends of said main body and inside surfaces of said blade half and clamping half when said blade and clamping halves are in a closed position, said cable receiving area in the direction and extending along said longitudinal axis of said main body, said ends of said main body being open ended and adapted to allow passage of the cable and adapted to also allow positioning of said cable stripping tool along the cable;

a blade mounted to said main body in the direction of said longitudinal axis of said main body such that said blade accesses the cable receiving area to allow stripping of the jacket from the cable, said blade secured in said blade half, said blade including a cutting edge, said cutting edge positioned in said cable receiving area and adapted to remove the pre-defined amount of cable jacket during one rotation of said main body about the cable; and said blade includes a single length of cutting edge having two ends and a middle and a cutting section between each of said ends and said middle and wherein said two ends and middle extend into said cable receiving area further than said cutting sections.

* * * * *